United States Patent [19]

Tanaka

[11] Patent Number: 5,765,178
[45] Date of Patent: Jun. 9, 1998

[54] ELECTRONIC MAIL RECEIVING SYSTEM ALLOWING RECEIVING PARTY CONTROL OF A DISPLAY FORMAT OF RECEIVED MAIL

[75] Inventor: Tsuyoshi Tanaka, Kanagawa, Japan

[73] Assignee: Fuji Xerox Co., Ltd., Tokyo, Japan

[21] Appl. No.: 782,083

[22] Filed: Jan. 13, 1997

Related U.S. Application Data

[63] Continuation of Ser. No. 306,563, Sep. 15, 1994, abandoned.

[30] Foreign Application Priority Data

Sep. 16, 1993 [JP] Japan ................................ 5-252114

[51] Int. Cl.⁶ ............................................. G06F 17/00
[52] U.S. Cl. ................................... 707/526; 707/500
[58] Field of Search .......................... 395/778, 788–791, 395/761; 358/402

[56] References Cited

U.S. PATENT DOCUMENTS

| | | | |
|---|---|---|---|
| 5,093,918 | 3/1992 | Heyen et al. | 395/725 |
| 5,283,856 | 2/1994 | Gross et al. | 395/51 |
| 5,283,887 | 2/1994 | Zachery | 395/500 |
| 5,333,266 | 7/1994 | Boaz et al. | 395/200.01 |
| 5,377,354 | 12/1994 | Scannell et al. | 395/650 |
| 5,483,466 | 1/1996 | Kawahara et al. | 364/514 C |
| 5,499,330 | 3/1996 | Lucas et al. | 395/145 |
| 5,508,817 | 4/1996 | Kunigami | 358/402 |
| 5,557,723 | 9/1996 | Holt et al. | 395/767 |

FOREIGN PATENT DOCUMENTS

| | | |
|---|---|---|
| 63-76542 | 4/1988 | Japan . |
| 3-131142 | 6/1991 | Japan . |

OTHER PUBLICATIONS

Gibbs, "E–mail encroaches on work flow tools", Network World, v. 10, n. 34, p. 25(2), Aug. 23, 1993.

Marshak, "Rules–based messaging: using electronic mail as the vehicle for customized workflow applications", The Workgroup Computing Report, v. 16, n. 10, p. 3(19), Oct. 1993.

Barbara et al., "The Gold Mailer", Proc. of the 9th Int'l Conf. on Data Engineering, pp. 92–99, Apr. 19, 1993.

Primary Examiner—Joseph R. Burwell
Attorney, Agent, or Firm—Finnegan, Henderson, Farabow, Garrett & Dunner, L.L.P.

[57] ABSTRACT

An electronic mail system that allows a party receiving electronic mail to designate a desired format for displaying electronic mail messages. For example, the receiving party may designate that all electronic mail messages received from their boss be displayed with the title in bold and in the color blue. For further illustration, the receiving party may designate that all mail marked as high priority be displayed with an enlarged and colored title and comment section.

4 Claims, 10 Drawing Sheets

TITLE: INVITATION TO THE FIRST MEETING ON DM PROJECT

SENDING PARTY: HONSHA KANRIBU

ORIGINATOR: TSUYOSHI TANAKA

DATE AND TIME OF TRANSMISSION: 9:09:09, SEPT. 9, 1999

DESTINATION: ALL DM MEMBERS

PRIORITY: MEDIUM

NO. OF PAGES: 1

COMMENT: YOU ARE INVITED TO THE TITLED MEETING THAT WILL TAKE PLACE ON SEPT. 19, 1999, AT 10:00 THROUGH 12:00, IN THE CONFERENCE ROOM OF THE GENERAL AFFAIRS DIVISION IN AKASAKA. THE SUBJECT WILL BE THE ACTION PROGRAM ON THE DM PROJECT TO BE IMPLEMENTED.

*FIG. 3*

| NO. | CONDITION | INTENDED PROCESSING |
|---|---|---|
| 0 | DEFAULT (IN EFFECT WHEN NONE OF THE FOLLOWING CONDITIONS IS MET) | TITLE AND CONTENTS OF COMMENT (COLOR → BLACK, FONT → MINCHO IN 12 POINTS,...), THE OTHER CONTENTS (COLOR → BLACK, FONT → MINCHO IN 10 POINTS,...), ALL ITEMS (COLOR → BLACK, FONT → GOTHIC IN 8 POINTS,...), ALL TEXT DISPLAYED,... |
| 1 | PRIORITY = HIGH | TITLE (COLOR → RED, FONT → GOTHIC IN 24 POINTS), COMMENT (COLOR → DARK BLUE, FONT → MINCHO IN 14 POINTS), ALL TEXT DISPLAYED |
| 2 | SENDING PARTY = HONSHA KANRIBU | TITLE (COLOR → GREEN, FONT → GOTHIC IN 14 POINTS), SENDING PARTY'S NAME NOT DISPLAYED |
| 3 | NO. OF CHARACTERS IN COMMENT ≧ 1000 | COMMENT (CHARACTERS < 100 → MINCHO IN 14 POINTS, CHARACTERS ≧ 100 → MINCHO IN 8 POINTS) |

*FIG. 4*

| MAIL PROPERTY | APPLY | COMPLETE | CANCEL |

| CONDITION NO. | DEFAULT 1 2 3 4 5 6 7 8 |

| CONDITION FORMULA | SENDING PARTY=HONSHA KANRIBU |

| OBJECT TO BE PROCESSED | TITLE | SENDING PARTY | ORIGINATOR | DATE AND TIME OF TRANSMISSION |
| | DESTINATION | PRIORITY | COMMENT |

| ELEMENTS | ITEMS | CONTENTS |

| FONT | MINCHO | GOTHIC |

| CHARACTER SIZE | 8 9 10 12 14 20 24 36 POINTS |

| CHARACTER COLOR | COLOR NAME DESIGNATED | PARAMETER DESIGNATED |
| | GREEN |

| DISPLAY | ALL TEXT | LIMITED TEXT |

*FIG. 5*

ELECTRONIC MAIL RECEIVING SYSTEM ALLOWING RECEIVING PARTY CONTROL OF A DISPLAY FORMAT OF RECEIVED MAIL

This application is a continuation of application Ser. No. 08/306,563, filed Sep. 15, 1994 now abandoned.

BACKGROUND OF THE INVENTION

1. Field of the Invention

The present invention relates to an electronic mail receiving system allowing receiving parties to retrieve mail of different contents and in different formats as desired.

2. Description of the Related Art

Conventional electronic mail systems generally allow a sending party to transmit mail of the same content and in the same format to a single or a plurality of destinations, and permit a receiving party to receive the mail as transmitted and to store it for subsequent retrieval. Meanwhile, different receiving parties may want to retrieve mail of different contents and/or in different formats. The conventional electronic mail system requires these receiving parties of different tastes to read all mail regardless of its contents in the same format. After retrieving the mail from the mail system, the receiving parties are obliged to make modifications so as to read only those mail contents needed and in the format desired. Such practice has been ineffective and inefficient as a form of communication between the sending and receiving parties.

A system disclosed in Japanese Patent Laid-open No. Sho 63-76542 allows a sending party to automatically transmit mail having different contents to different destinations. The disclosed system reflects the sending party's intentions, but not the receiving parties'. With this system, the receiving party is still unable to read the transmitted mail of desired contents in a desired format. Another system, proposed in Japanese Patent Laid-open No. Hei 3-131142, learns each receiving party's frequencies of mail use over time and judges the priorities of different units of mail handled, thereby making it easier for the receiving party to choose desired units of mail in a desired format. However, this system still does not permit receiving parties to select or process desired units of mail contents. That is, when a selected piece of mail is read, its contents and its format have yet to be processed appropriately. Unnecessary information may have been added to the mail, or the mail content that is of interest to a specific receiving party is not clearly indicated to that party. With the conventional systems, the intentions and objectives of the receiving parties have not been given sufficient attention.

SUMMARY OF THE INVENTION

It is therefore an object of the present invention to overcome the above-described drawbacks and disadvantages and to provide an electronic mail receiving system allowing a receiving party to retrieve mail of desired contents in a desired format from among the received pieces of mail of the same contents and in the same format.

In carrying out the invention and according to one embodiment, there is provided an electronic mail receiving system including an original mail storage unit for storing electronic mail transmitted over a mail receiving line. A receiver intention designating unit designates the intentions of a receiving party regarding a display of the electronic mail. A mail retrieval designating unit allows the receiving party to designate retrieval of the electronic mail. A mail processing unit processes the electronic mail in the original mail storage unit, in response to the designated electronic mail, based upon the intentions of the receiving party designated by the receiver intention designating unit. A mail display unit displays the mail processed by the mail processing unit.

In a preferred embodiment, the electronic mail receiving system further includes a processed mail storage unit for storing the mail processed by the mail processing unit.

According to another embodiment of the invention, the electronic mail receiving system includes an original mail storage unit for storing a plurality of electronic mail transmitted over a mail receiving line. A receiver intention designating unit designates the intentions of a receiving party regarding a display of the electronic mail. A mail retrieval designating unit allows the receiving party to designate retrieval of one of the plurality of electronic mail. A mail selection and processing unit selects and processes the electronic mail in the original mail storage unit based upon the intentions of the receiving party designated by the receiver intention designating unit. A mail display unit displays the designated electronic mail as processed by the mail selected and processed by the mail selection and processing unit.

In another preferred embodiment, the intentions of the receiving party assigns different display attributes to different sending parties.

The receiving party's intentions are designated by the receiver intention designating unit illustratively as follows:

(1) The designated intentions comprise processing conditions applicable to the original mail and processing orders regarding the mail.

(2) The designated intentions relate to display layout properties such as the character size, font and line spacing.

(3) The designated intentions concern the color(s) in which the characters are displayed.

(4) The intentions are designated to each of different items of the original mail, such as "subject," "sending party," etc.

(5) The intentions are designated both to the item names and to the item contents regarding the items of the original mail, such as "subject," sending party," etc.

(6) The intentions are designated for erasure of any of the items of the original mail, such as "subject," "sending party," etc.

In operation, the receiving party uses the receiver intention designating unit to designate the purpose and intentions regarding the reading of electronic mail before receiving any mail. Upon retrieval of electronic mail, the receiving party issues a retrieval order through the mail retrieval designating unit. The mail processing unit references information representing the receiving party's intentions, and processes the applicable mail in the original mail storage means. After processing, the mail is sent to the mail display means for display in the format reflecting the receiving party's intentions.

The invention lets original electronic mail of the same format be retrieved in a format reflecting individual receiving parties' intentions. This provides better communication between the sending and receiving parties.

In one preferred embodiment, the invention may include a processed mail storage unit for storing the mail processed by the mail processing unit. This feature facilitates repeated retrieval of the mail once it is processed and stored.

Furthermore, the invention uses the mail selection and processing means for selecting and processing original electronic mail. This makes it possible for the receiving party to refuse the receipt of specific mail so as to prevent confusion triggered by mail overflow and to save up on the mail storage capacity required.

In another preferred embodiment, the invention allows different display attributes to be assigned to different sending parties for better display effects on the mail transmitted therefrom.

These and other objects, features and advantages of the invention will become more apparent upon a reading of the following description and appended drawings.

BRIEF DESCRIPTION OF THE DRAWINGS

FIG. 3 is a view of an example of original mail handled by the first embodiment;

FIG. 4 is a view indicating a stored sample of a receiving party's intentions regarding received electronic mail;

FIG. 5 is a view showing a typical receiver intention designating operation sheet for use by the first embodiment;

DETAILED DESCRIPTION OF THE PREFERRED EMBODIMENTS

First Embodiment

Figure 1:
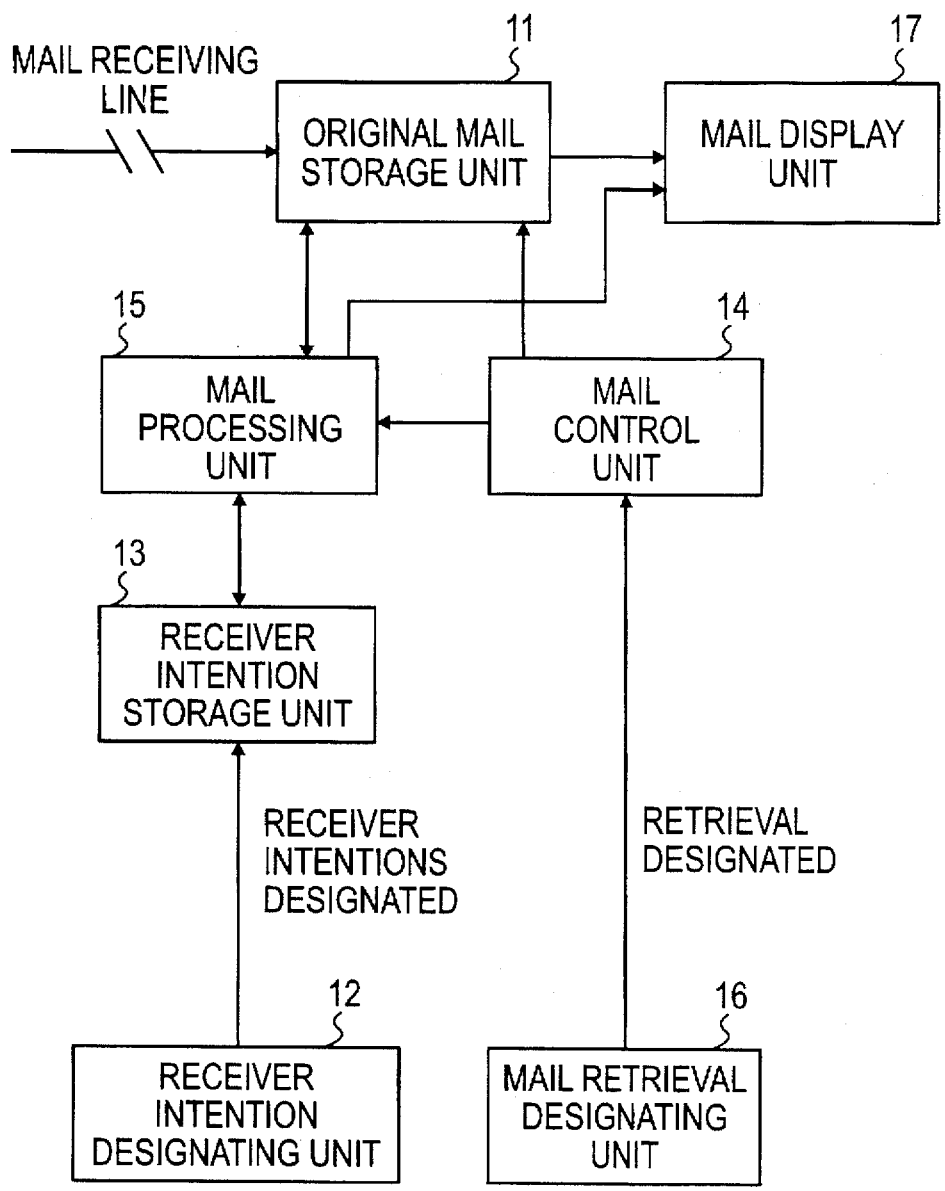
FIG. 1 is a block diagram of an electronic mail receiving system practiced as a first embodiment of the invention.

FIG. 1 shows the electronic mail receiving system of the first embodiment of the invention. The first embodiment includes an original mail storage unit 11 that stores electronic mail transmitted over a mail receiving line. A receiver intention designating unit 12 designates the receiving party's intentions regarding the electronic mail. A receiver intention storage unit 13 stores the receiving party's intentions designated by the receiver intention designating unit 12. A mail processing unit 15 processes the electronic mail in the original mail storage unit 11 in accordance with the information from the receiver intention storage unit 13 and according to what is designated by a mail control unit 14. A mail retrieval designating unit 16 informs the mail control unit 14 of the receiving party's intentions to retrieve the electronic mail. The mail control unit 14 orders the mail processing unit 15 to process the electronic mail as designated by the mail retrieval designating unit 16, sends the processed mail to a mail display unit 17, and retrieves the original electronic mail from the original mail storage unit 11 for transmission to the mail display unit 17. The mail display unit 17 displays the mail sent from the original mail storage unit 11.

Figure 2:
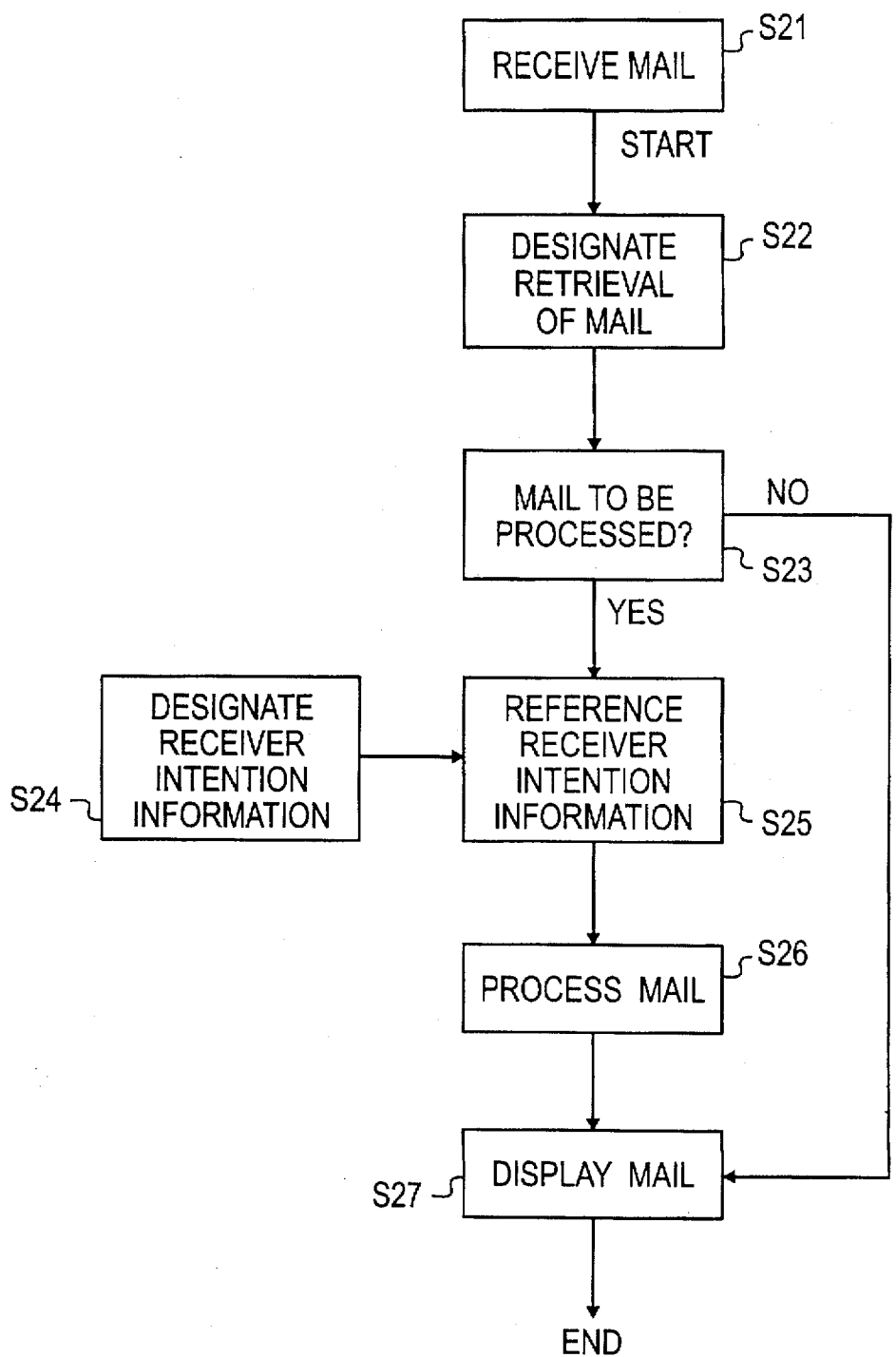
FIG. 2 is a flowchart of steps in which the first embodiment operates.

FIG. 2 is a flowchart showing the steps necessary for the first embodiment of FIG. 1. The original mail storage unit 11 is a storage unit generally known as the mailbox. Electronic mail transmitted over the mail receiving line is temporarily stored as transmitted in the original mail storage unit 11 (step 21). For example, the system called XNS (Xerox Network System) of Fuji Xerox Co., Ltd. has a mailbox represented by an icon on the workstation screen called a desk-top. When mail is received, the mailbox blinks and an envelope-shaped icon appears, indicating the receipt of the mail.

With the first embodiment, the receiving party uses the receiver intention designating unit 12 to designate his intentions before reading the electronic mail transmitted (step 24). The designation of the receiving party's intentions is generally accomplished by the XNS and other commonly employed systems allowing the receiving party to select, using a keyboard or a mouse, some of the alternatives displayed on the workstation screen.

The receiving party's selected intentions are kept in the receiver intention storage unit 13.

When retrieving the electronic mail, the receiving party uses the mail retrieval designating unit 16 to issue a mail retrieval order to the mail control unit 14 (step 22). The mail retrieval order is sent to the mail control unit 14 (i.e., processor) by the receiving party giving instructions on the workstation screen by operating the same keyboard or mouse as used for accessing the receiver intention designating unit 12. With the aforementioned XNS, the mail retrieval order is executed by giving an OPEN command to the mailbox icon on the screen.

Given the mail retrieval order from the mail retrieval designating unit 16, the mail control unit 14 causes the mail processing unit 15 to process the electronic mail in question. In turn the mail processing unit 15 uses the information in the receiver intention storage unit 13 (step 25) in processing the format of the applicable mail in the original mail storage unit 11 (step 26). The processed mail is sent to the mail display unit 17 for display in the format reflecting the receiving party's intentions (step 27). If it is desired to retrieve the mail in the original format, the mail retrieval unit 16 gives an appropriate order to the mail control unit 14. The mail control unit 14 then retrieves the original mail from the original mail storage unit 11 and displays it directly on the mail display unit 17 (step 23).

FIG. 3 shows an example of original mail transmitted over the mail receiving line to the original mail storage unit 11 for storage therein. FIG. 4 is a view indicating a stored sample of the receiving party's intentions held in the receiver intention storage unit 13. The information representing the receiving party's intentions is designated using the mouse for selecting data on the operation sheet illustrated in FIG. 5. The operation sheet is displayed to the user on a display screen.

The sample of intentions shown in FIG. 4 specify that any piece of mail given the "high" priority is to have its display attributes, such as title and comment area, enlarged and colored when displayed for better readability. In addition, all mail transmitted from the sending party, named "honsha kanribu," is to have its title displayed in a special color for immediate identification and the first 99 characters of any comment (1000 characters or more seeming too long for anyone to read with patience) are to be enlarged in size for readability on display for a birds'-eye-view understanding of the whole comment.

Figure 6:
FIG. 6 is a view depicting an example of electronic mail processed by the first embodiment.

The operation sheet example shown in FIG. 5 corresponds to the contents of FIG. 4. The sheet allows the receiving party to select in detail the processing conditions and instructions for the target mail. FIG. 5 shows an operation sheet example in which condition No. 2 of FIG. 4 is designated. It should be noted that the designating method is not limited to the scheme outlined in FIGS. 4 and 5. The original mail in FIG. 3 is processed as per what is designated as the receiving party's intentions in FIG. 4. The processed mail is displayed as shown illustratively in FIG. 6.

Second Embodiment

Figure 7:
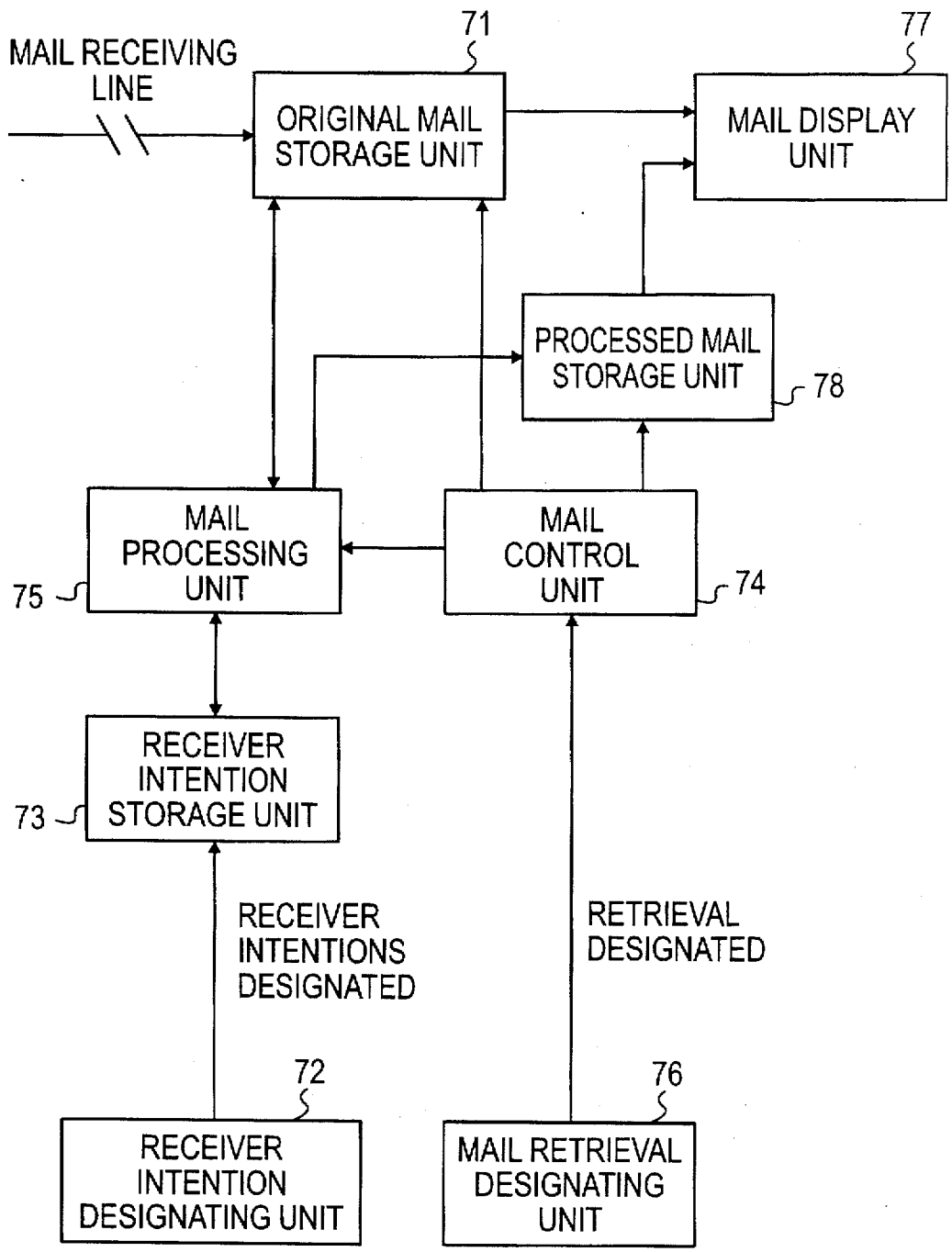
FIG. 7 is a block diagram of an electronic mail receiving system practiced as a second embodiment of the invention.
Figure 8:
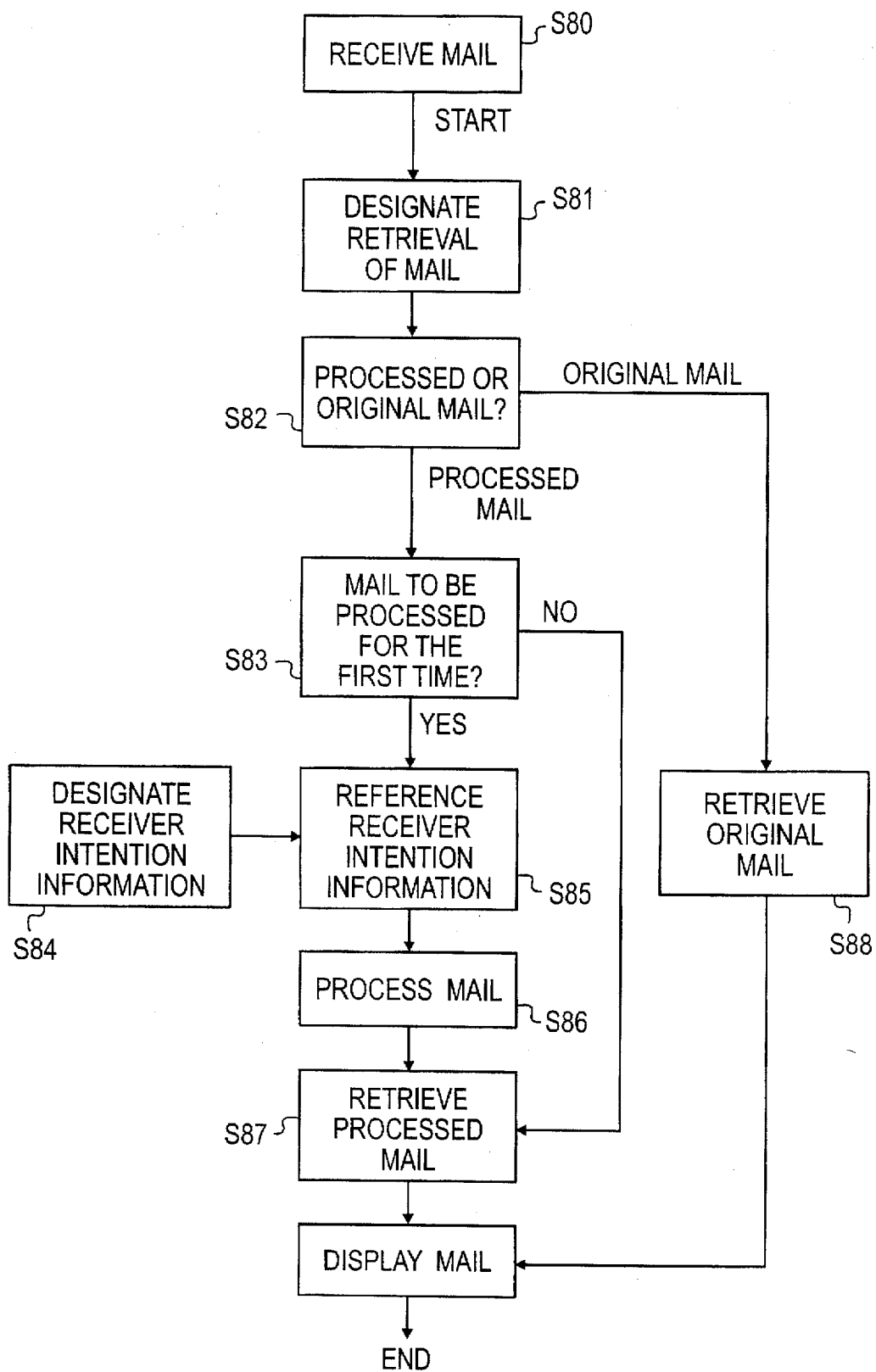
FIG. 8 is a flowchart of steps in which the second embodiment operates.

FIG. 7 shows the electronic mail receiving system of the second embodiment. The second embodiment is in fact a variation of the first embodiment supplemented by a processed mail storage unit 78. The second embodiment includes an original mail storage unit 71, a receiver intention designating unit 72, a receiver intention storage unit 73, a mail control unit 74, a mail processing unit 75, a mail retrieval designating unit 76 and a mail display unit 77. These component units correspond in function to their counterparts having the same names (11–17) in the first embodiment. These components have already been described in connection with the first embodiment and will not be described further in detail.

In the first embodiment, the mail processed by the mail processing unit 15 is sent directly to the mail display unit 17 and is not held in an intermediate storage. This means that every time the target mail is to be read, it needs to be processed again for display. By contrast, the second embodiment uses the processed mail storage unit 78 to retain processed mail. Once processed, the mail is held in the processed mail storage unit 78 and is later retrieved directly therefrom for repeated retrieval. Given a mail retrieval order (step 81), the mail control unit 74 checks to see if the ordered retrieval concerns processed mail or original mail (step 82). If the mail to be retrieved is original mail, the mail control unit 74 retrieves the mail in question from the original mail storage unit 71 (step 88). The retrieved mail is displayed on the mail display unit 77 (step 89). If the mail to be retrieved is processed mail, the processed mail storage unit 78 is checked to see if the target mail has yet to be processed (step 83). If the mail in question has already been processed, the processed mail is retrieved from the processed mail storage unit 78 (step 87). The retrieved mail is displayed on the display unit 77 (step 89). If the target mail has yet to be processed, the mail is processed in the same manner as with the first embodiment (steps 84 to 86). The processed mail is placed in the processed mail storage unit 78.

The processed mail storage unit 71 may be furnished independently. It may also be allocated as a separate storage area in the original mail storage unit 71.

The second embodiment allows the receiving party to immediately retrieve electronic mail already processed thereby omitting the intermediate processing steps.

Third Embodiment

Figure 9:
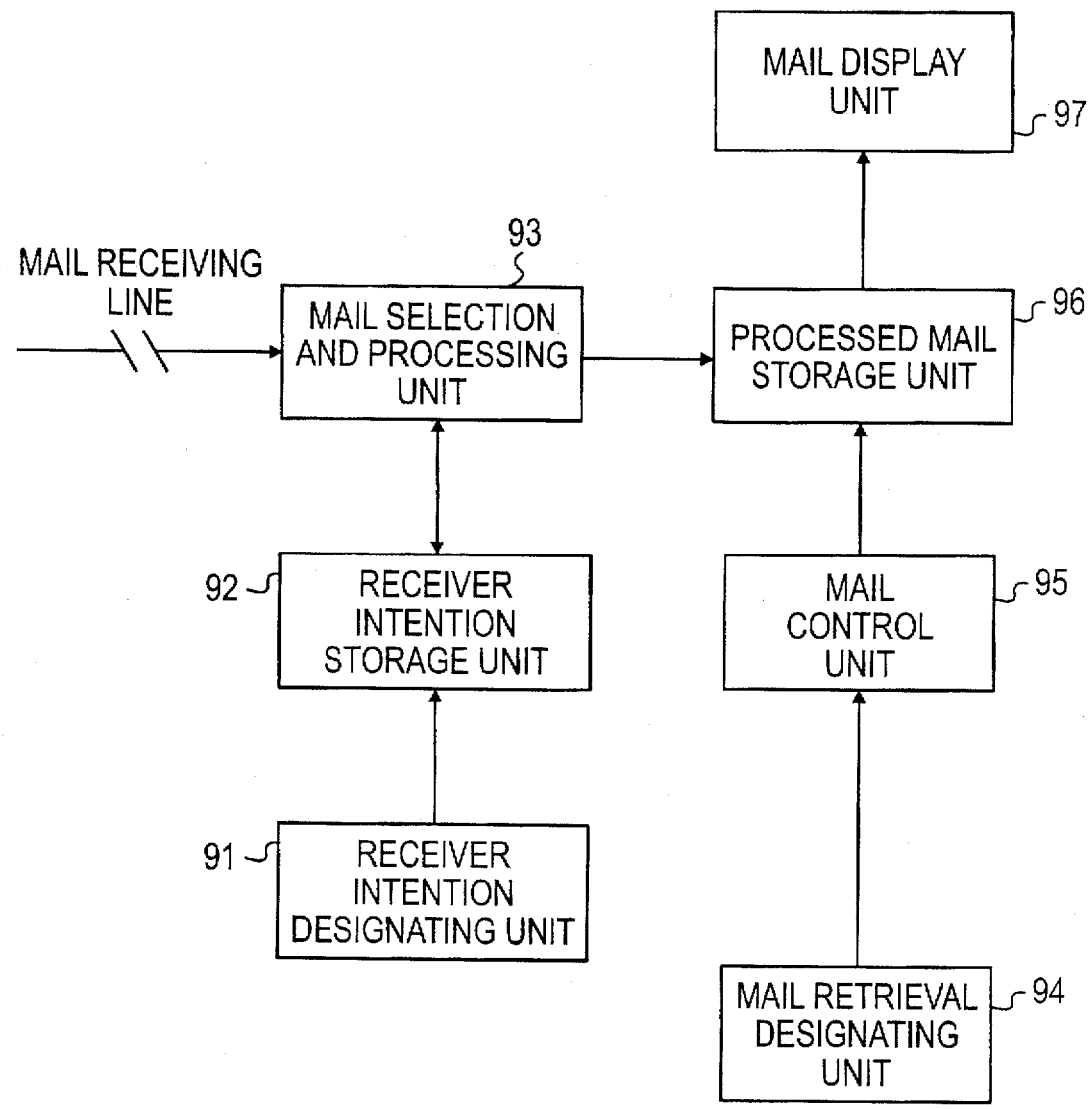
FIG. 9 is a block diagram of an electronic mail receiving system practiced as a third embodiment of the invention.
Figure 10:
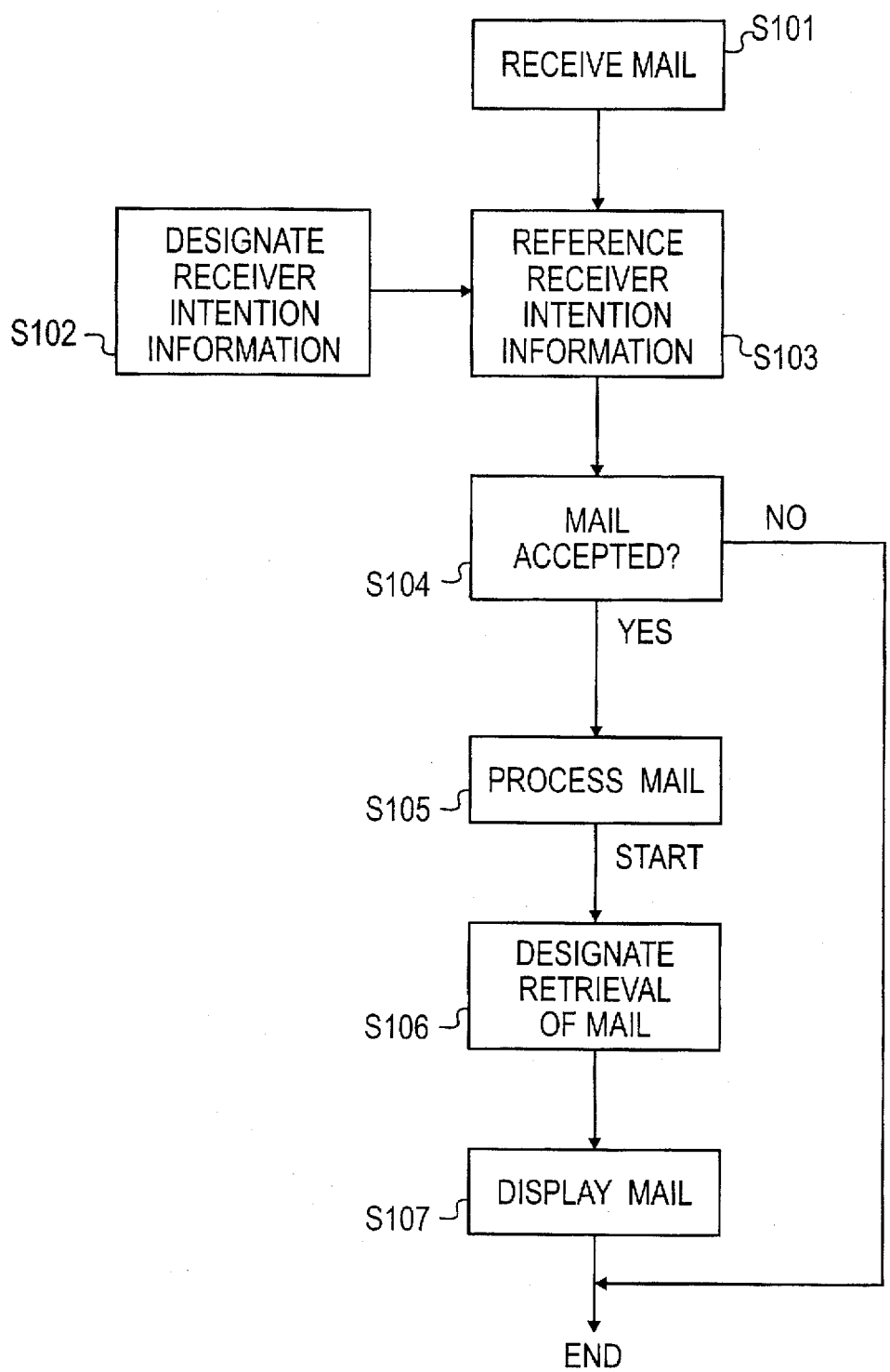
FIG. 10 is a flowchart of steps in which the third embodiment operates.

The electronic mail receiving system and method of the third embodiment is shown in FIGS. 9 and 10. Some of the elements already described in detail in connection with the first embodiment are identical to those of the third embodiment and will not be repeated.

When electronic mail is transmitted over the mail receiving line, the mail is selected and processed by the mail selection and processing unit. The processing of the mail is the same as discussed above with respect to the first embodiment. The third embodiment is different in that it has the ability to reject, prior to processing, those pieces of mail which come from specific sending parties or which have low priorities. The mail permitted to be received is processed in the manner reflecting the receiving party's intentions. The processed mail is stored in the mail storage unit. The mail thus stored is retrieved and displayed on the mail display unit under control of the mail control unit receiving orders from the mail retrieval unit. The rest of the processing is the same as the first embodiment.

The third embodiment allows the receiving party to process mail as desired and also to reject undesired mail before processing, thereby preventing mail overflow. Since only the selected mail is stored in the mail storage unit after processing, the storage capacity requirement is reduced.

Although the description above contains many specificities, these should not be construed as limiting the scope of the invention but as merely providing illustrations of the presently preferred embodiments of this invention. Changes and variations of the invention may be made without departing from the spirit and scope thereof. For example, another variation of the first embodiment may be devised as a fourth embodiment whereby different display attributes are assigned to different sending parties according to the receiving party's intentions.

The invention allows original electronic mail of the same format to be retrieved in a format reflecting an individual receiving parties' intentions. This provides better communication between the sending and receiving parties.

In one preferred embodiment, the invention may include the processed mail storage means for storing the mail processed by the mail processing means. This feature facilitates repeated retrieval of the mail once it is processed and stored.

Furthermore, the invention uses the mail selection and processing unit for selecting and processing original electronic mail. This makes it possible for the receiving party to refuse the receipt of specific mail so as to prevent mail overflow and to save up on the mail storage capacity required.

In another preferred embodiment, the invention allows different display attributes to be assigned to different sending parties for a more useful display.

What is claimed is:

1. An electronic mail receiving system comprising:

original mail storage means for storing electronic mail transmitted over a communications link;

receiver intention designating means for designating intentions of a receiving party regarding a display format of information fields in said electronic mail, said intentions including at least one of character size, font, line spacing, and color of characters, and said information fields including at least one of title, sending party, originator, and destination fields;

mail retrieval designating means allowing said receiving party to designate retrieval of said electronic mail;

mail processing means for processing said electronic mail stored in said original mail storage means, in response to said receiving party designated retrieval of said electronic mail, based upon the intentions of said receiving party designated by said receiver intention designating means; and mail display means for displaying the information fields of the processed electronic mail in the display format designated by the receiving party.

2. An electronic mail receiving system according to claim 1, further comprising processed mail storage means for storing the electronic mail processed by said mail processing means.

3. An electronic mail receiving system comprising:

original mail storage means for storing a plurality of electronic mail messages transmitted over a communications link;

receiver intention designating means for designating intentions of a receiving party regarding a display format of information fields in said plurality of electronic mail messages, said intentions including at least one of character size, font, line spacing, and color of characters, and said information fields including at least one of title, sending party, originator, and destination fields;

mail retrieval designating means allowing said receiving party to designate retrieval of one of said electronic mail messages;

mail selection and processing means for selecting and processing said plurality of electronic mail messages stored in said original mail storage means based on the intentions of said receiving party designated by said receiver intention designating means; and mail display means for displaying the fields of information of the designated one of said electronic mail messages selected and processed by said mail selection and processing means in the display format designated by the receiving party.

4. An electronic mail receiving system according to claim 1, wherein said intentions of said receiving party are different for different sending parties.

* * * * *